US012766871B2

(12) United States Patent
Brandol et al.

(10) Patent No.: US 12,766,871 B2
(45) **Date of Patent: *Oct. 20, 2026**

(54) METHOD AND ITEM FOR IDENTIFYING SERIALIZED PARTS

(71) Applicant: SilencerCo Weapons Research, LLC, West Valley City, UT (US)

(72) Inventors: Casey Brandol, West Jordan, UT (US); Jacob Turnblom, Broken Arrow, OK (US); Jared Hansen, West Valley City, UT (US); James Torgersen, Sandy, UT (US); Joshua Sensinger, Genola, UT (US)

(73) Assignee: SilencerCo Weapons Research, LLC, West Valley City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/318,016

(22) Filed: Sep. 3, 2025

(65) Prior Publication Data

US 2026/0034825 A1 Feb. 5, 2026

Related U.S. Application Data

(63) Continuation of application No. 18/671,181, filed on May 22, 2024, now Pat. No. 12,427,799, which is a continuation of application No. 17/749,940, filed on May 20, 2022, now Pat. No. 12,023,949.

(60) Provisional application No. 63/191,494, filed on May 21, 2021.

(51) Int. Cl.
*F41A 21/30* (2006.01)
*B42D 15/00* (2006.01)

(52) U.S. Cl.
CPC .......... *B42D 15/0033* (2013.01); *F41A 21/30* (2013.01)

(58) Field of Classification Search
None
See application file for complete search history.

(56) References Cited

U.S. PATENT DOCUMENTS

| | | | | |
|---|---|---|---|---|
| 4,346,530 | A * | 8/1982 | Stewart | F41C 23/18 42/71.01 |
| 5,632,108 | A * | 5/1997 | Ruger | F41C 23/10 42/71.02 |
| 7,739,821 | B1 * | 6/2010 | Hamme | F41C 23/04 42/8 |
| 8,650,793 | B1 * | 2/2014 | Mendez | F41G 11/003 42/90 |
| 8,789,305 | B1 * | 7/2014 | DiChario | F41A 3/66 42/75.03 |
| 9,310,160 | B1 * | 4/2016 | DiChario | F41C 23/10 |
| 9,683,805 | B2 * | 6/2017 | Wynalda, Jr. | B42D 15/00 |
| 11,326,847 | B1 * | 5/2022 | Bango | F41A 17/063 |
| 11,326,849 | B2 * | 5/2022 | Edminster | F41A 21/30 |
| 11,466,954 | B2 * | 10/2022 | Hughes | F41C 23/10 |

(Continued)

*Primary Examiner* — Derrick R Morgan
(74) *Attorney, Agent, or Firm* — Asgaard Patent Services, LLC; F. Wayne Thompson, Jr.

(57) ABSTRACT

Serialized parts, such as silencers, are identified using serialized plates permanently affixed to the parts by welding, brazing, riveting, pinning and welding, or by other permanent techniques. Methods of effecting repair or replacement of silencers and silencer parts involve removing the serialized plate by drilling or machining out the welds, and permanently affixing the serialized plate to a replacement part.

20 Claims, 2 Drawing Sheets

(56) References Cited

U.S. PATENT DOCUMENTS

| | | | | |
|---|---|---|---|---|
| 2005/0045056 | A1* | 3/2005 | EkenediliChukwu | F42B 39/26<br>102/501 |
| 2006/0010744 | A1* | 1/2006 | Schumacher | F41C 27/00<br>42/1.01 |
| 2008/0127538 | A1* | 6/2008 | Barrett | F41A 19/01<br>434/24 |
| 2009/0094870 | A1* | 4/2009 | Isserow | G09F 3/04<br>40/306 |
| 2011/0029009 | A1* | 2/2011 | Dietl | F41C 27/00<br>40/672 |
| 2016/0061551 | A1* | 3/2016 | Petersen | F41A 21/30<br>89/14.4 |
| 2016/0161205 | A1* | 6/2016 | Wynalda, Jr. | B42D 15/00<br>705/500 |
| 2017/0350669 | A1* | 12/2017 | Latka | F41A 21/30 |
| 2017/0363386 | A1* | 12/2017 | Matthews | F41A 17/34 |
| 2018/0100712 | A1* | 4/2018 | Tompkins | F41A 19/15 |
| 2018/0129920 | A1* | 5/2018 | Henry | G06K 7/1413 |
| 2019/0339036 | A1* | 11/2019 | Edminster | F41A 21/30 |
| 2021/0270551 | A1* | 9/2021 | Underwood | F41A 35/06 |
| 2022/0290939 | A1* | 9/2022 | Lee | F41A 19/15 |
| 2022/0307789 | A1* | 9/2022 | Kloepfer | F41A 19/59 |
| 2022/0325980 | A1* | 10/2022 | Walker | F41C 23/10 |
| 2022/0371354 | A1* | 11/2022 | Brandol | B42D 15/0033 |
| 2023/0107368 | A1* | 4/2023 | Hughes | F41A 19/12<br>434/21 |

* cited by examiner

METHOD AND ITEM FOR IDENTIFYING SERIALIZED PARTS

CROSS-REFERENCE TO RELATED APPLICATION(S)

This application is a continuation of U.S. patent application Ser. No. 18/671,181, filed on May 22, 2024, which is a continuation of U.S. patent application Ser. No. 17/749,940, filed on May 20, 2022, which claims the benefit of U.S. Provisional Application Ser. No. 63/191,494, filed on May 21, 2021. The entire disclosure of each of the above-referenced applications is incorporated herein by reference.

TECHNICAL FIELD

This disclosure relates to firearms, and serialized parts such as silencers.

BACKGROUND

The Gun Control Act of 1968 requires that all firearms manufactured or imported into the United States bear a serial number. The serial number must be conspicuously engraved, cast or stamped on the firearm frame or receiver. Previously, the National Firearms Act of 1934 defined categories of regulated firearms. In this classification scheme, silencers were defined as Title II weapons (along with machine guns), and are thus subject to an expensive stamp tax and required to bear a serial number even though they are not firearms. Silencers and machine guns are most heavily regulated. In fact, the components of a silencer are considered "silencers" by themselves, and replacement parts are regulated. However, the repair of original parts without replacement can be done by the original manufacturer, an FFL (Federal Firearms License) gunsmith, or by the registered owner without being subject to new registration, provided the serial number and the caliber are maintained. The length of a silencer may be reduced during repair, but cannot be increased. Increasing the length is considered making a new silencer.

Silencers are subject to considerable wear in their use. Multiple cycles of high internal pressure, projectile strikes on baffles, and high gas temperatures all take their toll and may require repair or replacement of silencer parts to maintain optimum performance. Furthermore, it may be desirable to change the length of a silencer for a particular need, for example, to reduce weight and length. The laws governing silencers, however, make repair and replacement a costly and time-consuming process. There is clearly an opportunity to improve the ability to repair or replace silencers while still operating safely and within the law.

SUMMARY

It is to be understood that this summary is not an extensive overview of the disclosure. This summary is exemplary and not restrictive, and it is intended neither to identify key or critical elements of the disclosure nor delineate the scope thereof. The sole purpose of this summary is to explain and exemplify certain concepts of the disclosure as an introduction to the following complete and extensive detailed description.

Disclosed is a silencer comprising an essential part with an outer surface having a recessed portion. A ring bearing a serial number is inlaid and permanently affixed to the recessed portion. The interior surface of the ring follows a first arc, and the outer surface of the essential part follows a second arc that is substantially concentric with the first arc.

Disclosed is a method of permanently affixing a serialized ring onto an essential part of a silencer. In this method, a ring bearing a serial number is inlaid into a recessed portion of an outer surface of the essential part. The interior surface of the ring follows a first arc and the outer surface of the essential part follows a second arc, the first arc and the second arc being concentric when the ring is inlaid in the recessed portion. The method also includes permanently affixing the ring to the recessed portion.

Disclosed is a method of repairing or replacing an essential part of a silencer. In this method, an essential part is received in which a ring bearing a serial number is inlaid and permanently affixed to a recessed portion of an outer surface of the essential part. The interior surface of the ring follows a first arc and the outer surface of the essential part follows a second arc, the first arc and the second arc being concentric. The method also includes removing the ring from the essential part and permanently affixing the ring to a replacement essential part.

Any aspect of any embodiment, in combination with any one or more aspects of any other embodiment(s).

Any one or more of the features disclosed herein.

Any one or more of the features as substantially disclosed herein.

Any one or more of the features as substantially disclosed herein, in combination with any one or more other features as substantially disclosed herein.

Any one of the aspects, features, or embodiments, in combination with any one or more other aspects, features, or embodiments.

Use of any one or more of the aspects or features disclosed herein.

It should be appreciated that any feature described herein can be claimed in combination with any other feature(s) described herein, regardless of whether the features originate from the same described embodiment.

The details of one or more aspects of the disclosure are set forth in the accompanying drawings and the description below. Other features, objects, and advantages of the techniques described in this disclosure will be apparent from the description and drawings, and from the claims.

Numerous additional features and advantages of the present disclosure will become apparent to those skilled in the art upon consideration of the embodiment descriptions provided below.

Additional features and advantages are described herein and will be apparent from the following description and figures.

BRIEF DESCRIPTION OF THE DRAWINGS

Like reference numerals refer to corresponding parts throughout the several views of the drawings.

DETAILED DESCRIPTION

Figure 1:
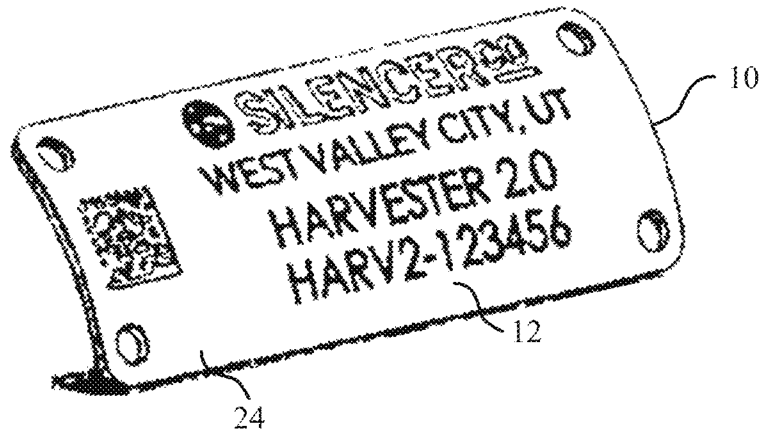
FIG. 1 is an isometric view of an example serialized plate according to the principles of the present disclosure.

FIG. 1 shows an example plate 10 used to identify a serialized part, in this example a silencer. The plate 10 is advantageously made from a durable metal, for example titanium, steel, or heat-treated steel. The plate 10 bears a serial number 12 among other indicia, the serial number 12 being engraved in the plate 10, and thus the plate 10 is also considered a serialized part, referred to herein as "serialized plate 10."

Figure 2:
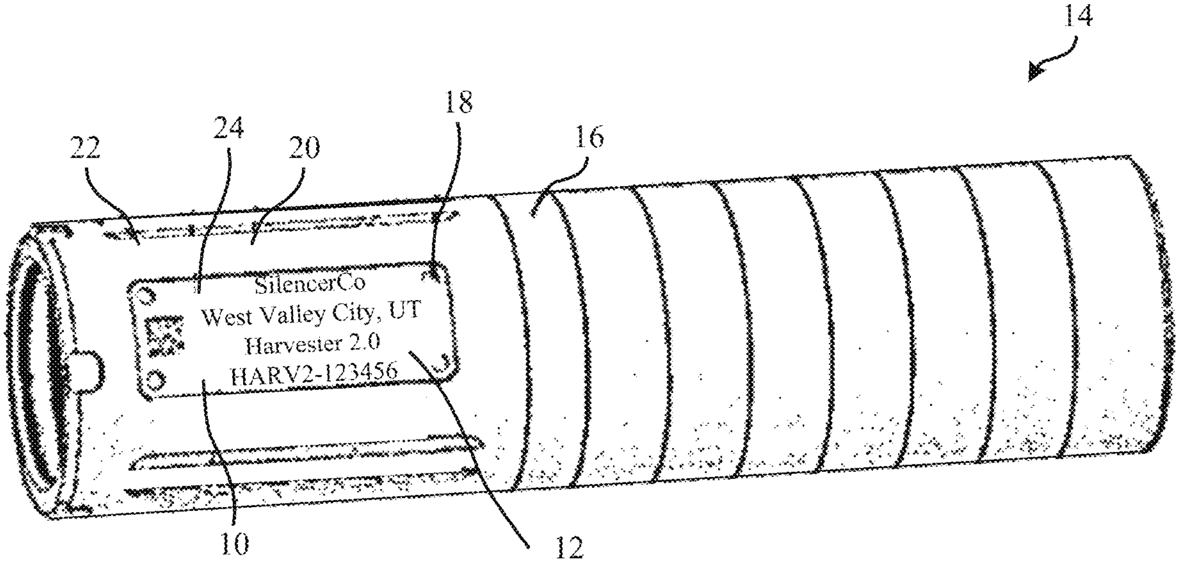
FIG. 2 is an isometric view of an example serialized plate and other essential parts of a silencer according to the principles of the present disclosure.
Figure 3:
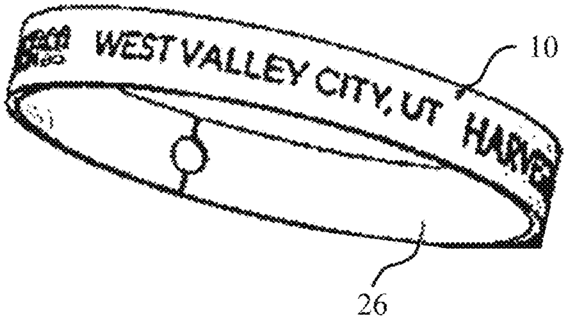
FIG. 3 is an isometric view of another example serialized plate according to the principles of the present disclosure.
Figure 4:
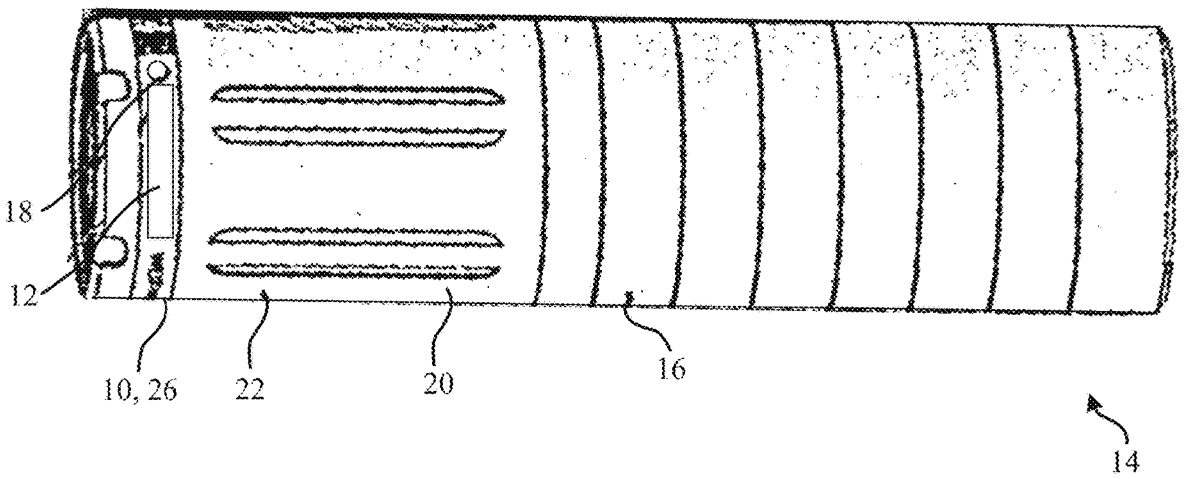
FIG. 4 is an isometric view of another example serialized plate and other essential parts of a silencer according to the principles of the present disclosure.

FIG. 2 shows an example serialized part 14 comprising the plate 10 bearing the serial number 12 and a silencer 16. The serialized plate 10 is permanently affixed to an essential part of the silencer 16, in this example the expansion chamber 20. In this context, the term "permanently affixed" means that the serialized plate 10 is attached to the silencer 16 using a technique that makes it difficult to remove. Such techniques include welding, brazing, riveting, and pinning and welding. In this example embodiment, four plug welds 18 are used to attach the serialized plate 10 to the expansion chamber 20 of the silencer 16. Plug-welding the serialized plate 10 to the silencer 16 clearly meets the definition of "permanently affixed," as the plug welds 18 must be carefully drilled out or removed by a machining process to effect removal of the serialized plate 10 without damaging the silencer 16. To further increase the difficulty of plate removal, the serialized plate 10 may be inlaid into an outer surface 22 of the silencer 16. In this example, a surface 24 of the serialized plate 10 is inlaid flush with the outer surface 22 of the silencer 16. Although the plate 10 has a polygonal shape (in this example, a rectangle) in FIGS. 1 and 2, the plate 10 may take any practical form and curvature as needed to adapt it to a particular essential part of the silencer 16. As shown in FIGS. 3 and 4, the plate 10 comprises a ring 26 that is plug-welded to the silencer 16.

The disclosure further encompasses a method of identifying a serialized part 14, such as a silencer 16. In an example embodiment, the method comprises permanently affixing a plate 10 bearing a serial number 12 to the part 14. Permanently affixing may include welding, brazing, riveting, or pinning and welding the serialized plate 10 to the part 14 as described above for FIGS. 2 and 4, wherein the serialized part 14 comprises a silencer 16. The method may further comprise inlaying the plate 10 into an outer surface 22 of the silencer 16, or other part, prior to the step of permanently affixing the plate 10 to the part.

Also encompassed by the disclosure is a method of effecting repair of an essential part of a silencer. An example part 14 (e.g., the silencer 16) is shown in FIG. 2 and comprises the plate 10 bearing a serial number 12 thereon. The serialized plate 10 is permanently affixed to the part 14 by welding, brazing, riveting, pinning and welding, or another technique having the requisite characteristics consistent with permanently affixed, as defined herein.

An example method of effecting repair according to the disclosure comprises:

- an owner of the silencer, including the serialized plate, releasing the silencer to a manufacturer thereof;
- the manufacturer removing the serialized plate from the original essential part and permanently affixing the serialized plate to a replacement essential part;
- the manufacturer releasing the silencer, including the serialized plate and replacement essential part, to the owner; and
- the manufacturer retaining the original essential part.

A further example method of effecting repair of an essential part of a silencer may comprise:

- an owner of the silencer, including the serialized plate, releasing the silencer to a holder of a Federal Firearms License;
- the holder of the Federal Firearms License removing the serialized plate from the original essential part and permanently affixing the serialized plate to a replacement essential part;
- the holder of the Federal Firearms License releasing the silencer, including the serialized plate and replacement essential part, to the owner; and
- the holder of the Federal Firearms License retaining the original essential part.

Regardless of whether the example repair method requires release of the silencer (e.g., silencer 16), including the serialized plate (e.g., serialized plate 10), to a manufacturer or a holder of a Federal Firearms License, various steps of the method are common. For example, the step of removing the serialized plate 10 may comprise drilling or machining out welds permanently affixing the serialized plate 10 to the original essential part. Permanently affixing the serialized plate 10 to the replacement essential part may comprise welding, brazing, riveting, or pinning and welding the serialized plate 10 to the replacement essential part. When the serialized part 14 comprises a silencer (e.g., silencer 16), the replacement essential part may be shorter than the original essential part, or the replacement essential part may be a different caliber than the original essential part. When the method requires release of the silencer, including the serialized plate 10, to a manufacturer, the manufacturer may be the original manufacturer of the silencer, or another manufacturer of similar parts.

The disclosure also includes methods of replacing an essential part of a silencer. One example method comprises:

- an owner of the silencer, including the serialized plate, releasing the silencer to a manufacturer thereof;
- the manufacturer removing the serialized plate from the original essential part and permanently affixing the serialized plate to a replacement essential part;
- the manufacturer releasing the silencer, including the serialized plate and replacement essential part, to the owner;
- the manufacturer retaining the original essential part.

Another example method of replacing an essential part comprises:

- an owner of the silencer, including the serialized plate, releasing the silencer to a holder of a Federal Firearms License;
- the holder of the Federal Firearms License removing the serialized plate from the original essential part and permanently affixing the serialized plate to a replacement essential part;
- the holder of the Federal Firearms License releasing the silencer, including the serialized plate and replacement essential part, to the owner;
- the holder of the Federal Firearms License retaining the original essential part.

Regardless of whether the example replacement method requires release of the serialized part (e.g., part 14) to a manufacturer or a holder of a Federal Firearms License, various steps of the method are common. For example, the step of removing the serialized plate (e.g., serialized plate 10) may comprise drilling or machining out welds permanently affixing the serialized plate 10 to the original essential part. Permanently affixing the serialized plate 10 to the replacement essential part may comprise welding, brazing, riveting, or pinning and welding the serialized plate 10 to the replacement essential part. For a silencer (e.g., silencer 16), the replacement essential part may be shorter than the original essential part, or the replacement essential part may be a different caliber than the original essential part. When the method requires release of the silencer, including the serialized plate 10, to a holder of a Federal Firearms License, the holder may be the original holder from which the silencer was purchased, or another holder of a Federal Firearms License.

The foregoing description of the invention is intended to be illustrative; it is not intended to be exhaustive or to limit the claims to the precise forms disclosed. Those skilled in the relevant art can appreciate that many modifications and variations are possible in light of the foregoing description and associated drawings.

Reference throughout this specification to an "embodiment," "implementation," or words of similar import indicates that a particular described feature, structure, or characteristic is included in at least one embodiment of the present disclosure. Thus, the phrase "in some implementations," or a phrase of similar import, as used throughout this specification, does not necessarily refer to the same embodiment.

The described features, structures, or characteristics may be combined in any suitable manner in one or more embodiments. In the above description, numerous specific details are provided for a thorough understanding of embodiments of the present disclosure. One skilled in the relevant art will recognize, however, that embodiments of the present disclosure can be practiced without one or more of the specific details, or with other methods, components, materials, etc. In other instances, well-known structures, materials, or operations may not be shown or described in detail.

The invention claimed is:

1. A silencer, comprising:
- an essential part comprising an outer surface having a recessed portion;
- a ring bearing a serial number, wherein the ring is inlaid and permanently affixed to the recessed portion;
- wherein an interior surface of the ring follows a first arc; and
- wherein the outer surface of the essential part follows a second arc that is substantially concentric with the first arc.

2. The silencer of claim 1, wherein the essential part is an expansion chamber of the silencer.

3. The silencer of claim 1, wherein the ring is welded or brazed to the essential part.

4. The silencer of claim 1, wherein an outer surface of the recessed portion follows a third arc substantially concentric with the second arc.

5. The silencer of claim 1, wherein an outer surface of the ring follows a fourth arc that is substantially concentric with the second arc.

6. The silencer of claim 1, wherein an outer surface of the ring is substantially flush with the outer surface of the essential part.

7. The silencer of claim 1, wherein the recessed portion and the ring have shapes that correspond to one another.

8. The silencer of claim 1, wherein the recessed portion extends around a circumference of the essential part of the silencer and the ring has a circular shape.

9. A method, comprising:
- inlaying a ring bearing a serial number in a recessed portion of an outer surface of an essential part of a silencer, wherein an interior surface of the ring follows a first arc, wherein the outer surface of the essential part follows a second arc, and wherein the first arc and the second arc are concentric when the ring is inlaid in the recessed portion; and
- permanently affixing the ring to the recessed portion.

10. The method of claim 9, wherein permanently affixing the ring to the recessed portion comprises: welding, brazing, riveting, or pinning and welding the ring to the recessed portion.

11. The method of claim 9, further comprising: after permanently affixing the ring to the recessed portion, attaching the essential part to a second part of the silencer.

12. The method of claim 9, wherein an outer surface of the recessed portion follows a third arc substantially concentric with the second arc.

13. The method of claim 9, further comprising: forming the essential part; and wherein a shape of the recessed portion is similar to a shape of the ring.

14. The method of claim 9, wherein an outer surface of the ring follows a fourth arc that is concentric with the first arc and the second arc.

15. The method of claim 14, wherein the outer surface of the ring is flush with the outer surface of the essential part.

16. The method of claim 9, wherein an outer surface of the ring is flush with the outer surface of the essential part.

17. A method, comprising:
- receiving an essential part of a silencer, wherein: a ring bearing a serial number is inlaid and permanently affixed to a recessed portion of an outer surface of the essential part, an interior surface of the ring follows a first arc, and the outer surface of the essential part follows a second arc that is concentric with the first arc;
- removing the ring from the essential part; and
- permanently affixing the ring to a replacement essential part.

18. The method of claim 17, wherein the essential part is operably connected to one or more additional silencer components to form the silencer.

19. The method of claim 17, further comprising: releasing, after permanently affixing the ring to the replacement essential part, the replacement essential part; and retaining, after releasing the replacement essential part, the essential part.

20. The method of claim 17, wherein an outer surface of the recessed portion follows a third arc substantially concentric with the second arc.

* * * * *